H. G. SMITH.
WINDSHIELD.
APPLICATION FILED NOV. 12, 1919.
1,352,094.
Patented Sept. 7, 1920.
2 SHEETS—SHEET 2.
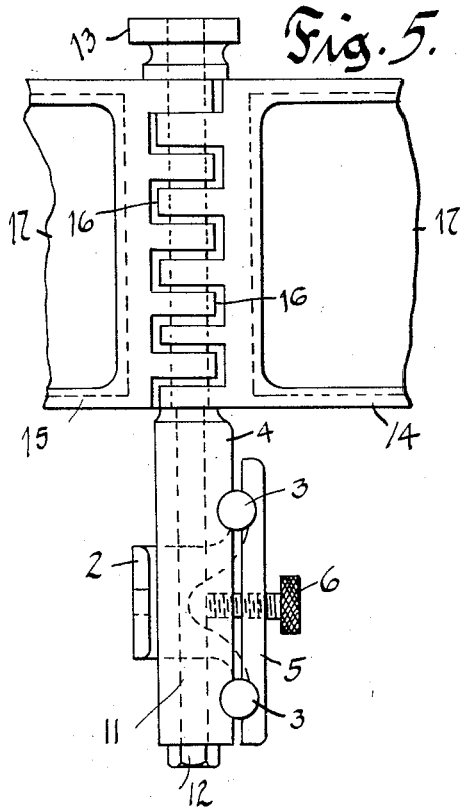
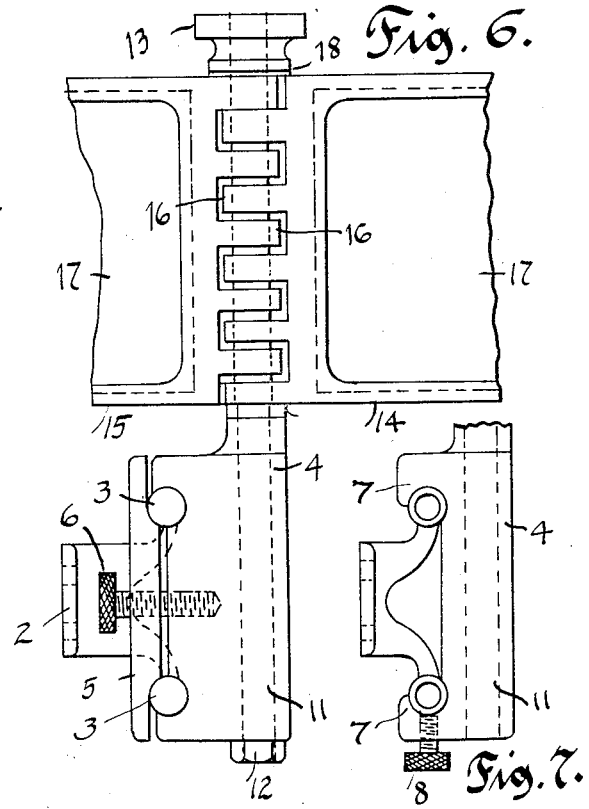
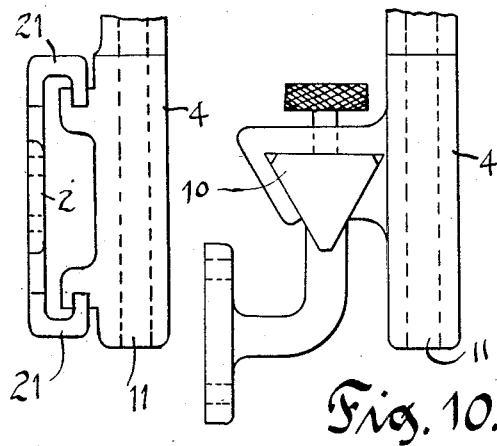
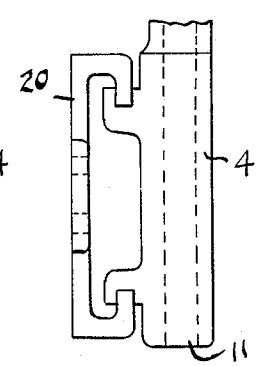
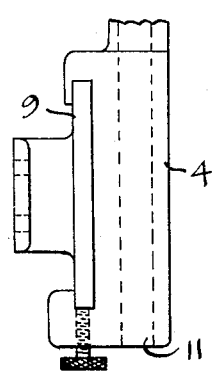
INVENTOR
Harley G. Smith
BY
F. K. Caswell
ATTORNEY H. G. SMITH.
WINDSHIELD.
APPLICATION FILED NOV. 12, 1919.
1,352,094.  Patented Sept. 7, 1920.
2 SHEETS—SHEET 1.
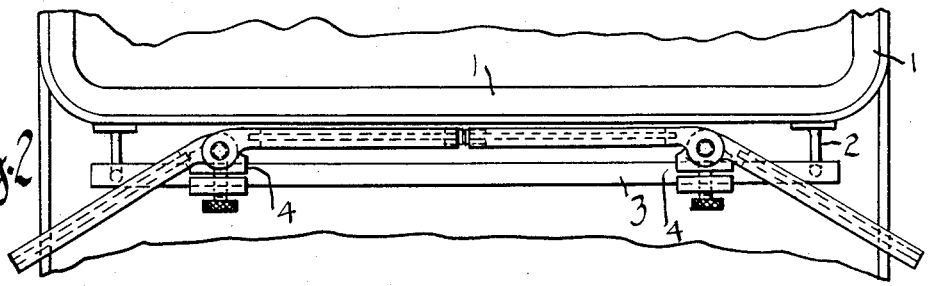
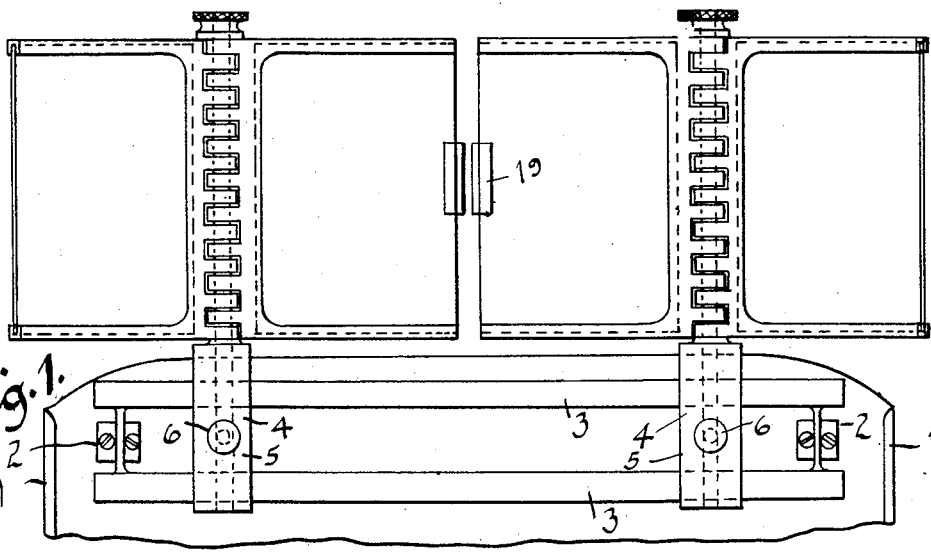
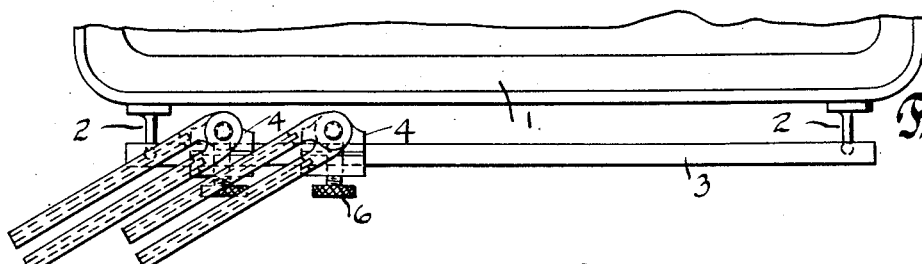
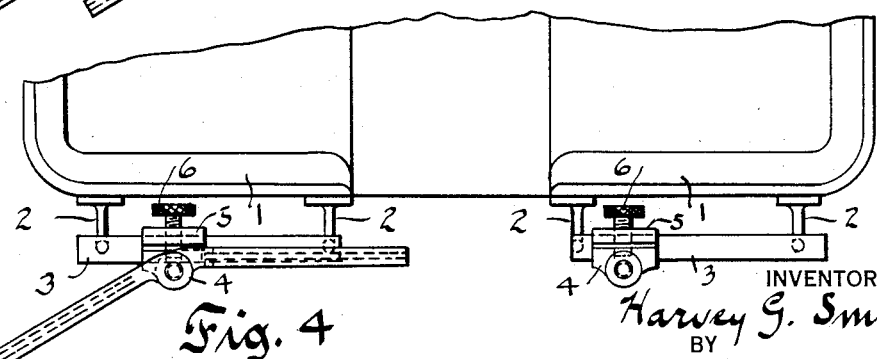
INVENTOR
Harvey G. Smith
BY
F. K. Caswell
ATTORNEY

UNITED STATES PATENT OFFICE.

HARVEY G. SMITH, OF LOS ANGELES, CALIFORNIA, ASSIGNOR OF ONE-HALF TO VERNA B. LIEBMANN, OF SAN DIEGO, CALIFORNIA.

WINDSHIELD.

1,352,094.   Specification of Letters Patent.   Patented Sept. 7, 1920.

Application filed November 12, 1919. Serial No. 337,539.

*To all whom it may concern:*

Be it known that I, HARVEY G. SMITH, a citizen of the United States, residing at Los Angeles, in the county of Los Angeles and State of California, have invented certain new and useful Improvements in Windshields, of which the following is a complete specification.

My invention relates to that class of wind shields which are intended to be attached to the back of the front seat of a vehicle having two or more seats and is for the purpose of protecting from the wind those passengers occupying the rear seats. The object of my improvement is to provide a wind shield which is completely adjustable and capable of being folded or rotated in such a manner as to perform the office of a side wind deflector alone or in combination with a wind shield across the body of the vehicle. Another object of my invention is to provide a means whereby the said adjustable wind shield can be readily moved from one side of the vehicle to the other, or which can be removed with the least possible effort. It is also my object to provide a device which can be applied to existing vehicles with a minimum of expense and with little or no alteration in the body of the said vehicle.

I attain these objects by the mechanism illustrated in the accompanying drawings in which Figure 1 is a rear elevation of my device in position attached to the back of one of the seats of the vehicle. Fig. 2 is a plan view of the device as shown in Fig. 1, with the inner or main wind shields extended across the vehicle and the outer wind shields rotated to an angular position suitable for deflecting the side winds. Fig. 3 is a similar plan view showing both double wind shields folded together and moved to the left side of the vehicle where they are out of the way of passengers entering or leaving the vehicle on its right side. Fig. 4 is a plan view of a similar construction adapted to a vehicle of the so-called "Clover-leaf" type having an aisle between the two sections of the front seat. In this construction there are two separate sets of slide bars used. Fig. 5 is a side elevation of the mechanism showing two round slide bars. Fig. 6 is similar to Fig. 5 but with the hinge post back of the slide bars. Fig. 7 is similar to Fig. 6 but showing a method of one piece slide and means of locking same on two tubular rods. Fig. 8 is a side view of a hinge post and slide adapted to be moved and locked on a single plate or bar attached to the vehicle. Fig. 9 is a side view of a hinge post and slide adapted to be used with a single channel-shaped plate or bar. Fig. 10 is a side view of a method of using a triangular sectioned single bar on which the hinge post and slide is moved and locked. Fig. 11 is a side view similar to Fig. 9 but showing two channel bars in place of one. Similar figures refer to similar parts in the several views. 1 is the back of one of the seats of a vehicle. 2 are brackets adapted to be attached to said back. Integral with said brackets 2 or attached to same by any convenient means such as welding, by bolts or screws, are the two rods 3. The rods 3 may extend partially or entirely across the back of the said seat 1, or may be in two sections as shown in Fig. 4. In this latter construction two of the brackets 2 are preferably attached to each pair of rods 3. Adapted to slide on the rods 3 are the hinge post brackets 4, which in the construction as shown in Figs. 1, 2, 3, and 5, is located between the rods 3 and the seat back 1, with a clamp plate 5 and a clamp screw 6 adapted to lock said hinge post bracket at any desired position. In the construction shown in Figs. 4 and 6 the hinge post bracket 4 is outside of the rods 3 and the clamp plate 5 and clamp screw 6 located between the rods 3 and the seat back 1. The rods 3 may be of any desired section without departing from the spirit of my invention. In the construction shown in Fig. 7 the hinge post bracket 4 is lipped over the tubular rods 3 at 7, a set-screw 8 being used to lock the bracket in any desired position.

In the construction shown in Fig. 8, a plate 9 is substituted for the rods 3. One advantage of the plate 9 is that it can be curved to conform to the contour of the seat back 1. Another advantage of this construction is that the bracket 4 may be slid over to one side and completely off without disconnecting any part like the clamp plate 5 in the previous construction. Fig. 9 shows a modification of the design in Fig. 8 using a plate 20 of semi-box form. In Fig. 10 only one bar 10 is used which may be of triangular section as shown or of any other desired section which would prevent rotation of the bracket 4. In the form shown the brackets 2 are welded to the base of the rod 10. In Fig. 11 two channel bars 21 are used with the brackets 2 connecting them. Vertically mounted in a socket 11 of the brackets 4 are the hinge posts 12, provided at their upper ends with locking nuts 13. Revolubly mounted on the hinge posts 12 are the frames 14 and 15 which have interlocking hinge eyes 16 on their inner vertical edges and being provided with three sides grooved or otherwise adapted to receive glass plates 17 or if desired plates of celluloid or other material. It will be noticed that the hinge eyes 16 of the frame 14 bears on the top of the bracket 4 and that there is a vertical clearance between each hinge eye above the bottom one until the top one is reached, the two top hinge eyes bearing on each other directly. This construction is to provide a means whereby the locking nut 13 will not only lock the position of the frame 15 on which it bears, but will also lock the frame 14 at the same time. The bearing between the top of the bracket 4 and the bottom hinge eye 16 may be corrugated radially if desired to more securely lock the frames 14 and 15 in any desired position. If desired a friction washer 18 may be inserted between the top hinge eye and the lower side of the locking nut 13. This may be of rubber, or any other suitable material. On the abutting edges of the plates 17 may be placed rubber guards 19 to prevent any injury to the said plates if accidentally brought together, either by misadjustment or by any racking strain in the body of the vehicle.

The operation of my device is as follows: The brackets 2 having been attached to the back of the seat 1 and the rods 3 in position on the brackets 2, the hinge post bracket 4 is either clamped in position or slid onto the rods 3 or the plate 9 and single bar 10. The hinge posts 12 are mounted in the sockets 11 and the hinge eyes 16 are mounted on the hinge posts 12 and the locking nuts 13 are screwed in place. The plates 17 in their frames 14 and 15 can now be rotated around the hinge posts 12 into any desired position. Each group consisting of the bracket 4, the hinge post 12, the frames 14 and 15 and the plates 17 can be moved laterally along the rods 3 or the plate 9 or the bar 10 and locked by the set screw 6 or 8. The two central plates can be rotated so as to allow conversation with persons on the front seat while still getting the protection of the outer plates acting as side wind deflectors. The plates of one or both groups can be moved laterally to one side of the vehicle and folded so as to be out of the way of persons entering or leaving the vehicle.

What I claim as my invention and desire to secure by Letters Patent is:—

1. In a wind shield, one or more groups each comprising a plate or plates rotatively mounted on a vertical hinge post, and means for attaching and independently laterally adjusting and locking each of said groups on a horizontal bar or bars; all substantially as shown and described.

2. In a wind shield, a plate or plates revolubly mounted on a vertical hinge post and means for attaching and laterally adjusting and locking said hinge post on a horizontal bar or bars; all substantially as shown and described.

3. In a wind shield, one or more window frames or windows or both revolubly mounted on a vertical hinge post and means for attaching and for laterally adjusting and locking said hinge post on a horizontal bar or bars; all substantially as shown and described.

4. In a wind shield, a horizontal bar or bars attached to a vehicle, a hinge post laterally adjustable on said bar or bars, frames or windows or both revolubly mounted on said hinge post, and means for locking said frames or windows or both on said hinge post; all substantially as shown and described.

5. In a wind shield, a bar or bars adapted to be attached to a vehicle, one or more brackets adapted to slide laterally on said bar or bars, a hinge post vertically mounted in said sliding bracket, one or more windows or frames or both mounted on said hinge post by means of interlocking hinge eyes and adapted to rotate around said hinge post, and means for locking said frames or windows and said sliding bracket or brackets; all substantially as shown and described.

HARVEY G. SMITH.

Witnesses:
AUGUSTA I. FELDMILLER,
REGINALD HODGKINS.